Figure 1:
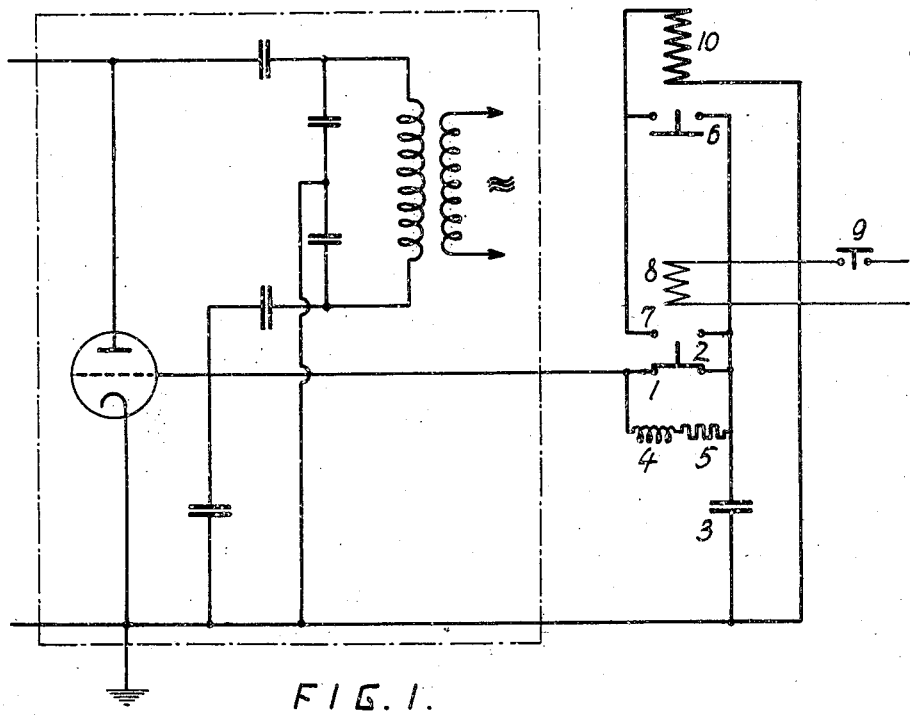

Nov 1, 1949.                    J. STIVÍN                     2,486,504
                DEVICE FOR REPEATED FREQUENT STARTING AND
                     STOPPING OF OSCILLATION GENERATORS
Filed July 3, 1947                                       2 Sheets-Sheet 1

Patented Nov. 1, 1949

2,486,504

UNITED STATES PATENT OFFICE 2,486,504

DEVICE FOR REPEATED FREQUENT STARTING AND STOPPING OF OSCILLATION GENERATORS

Jiří Stivín, Rychnov u Jablonce nad Nisou, Czechoslovakia

Application July 3, 1947, Serial No. 758,856
In Czechoslovakia August 27, 1946

5 Claims. (Cl. 250—36)

1

The present invention relates to a method and device for frequent starting and stopping of an oscillation generator, as required e. g. in employing such a generator for the supply of a plant for heat treatment of metals or the like.

Up to now oscillation generators have been put in or out of operation in any of the following ways:

1. By switching on or off the anode voltage.
2. By connecting or disconnecting the grid, the anode voltage remaining on also during inoperative periods.
3. By connecting the grid with the cathode during inoperative periods, the grid being disconnected when operation of the generator is desired.
4. When generator has to be put out of operation a negative bias is applied to the grid, said bias being eliminated when operation of the generator is desired.

All these hitherto used methods suffer certain drawbacks; the first three methods are unsatisfactory for that reason that the respective switches have to be dimensioned for a high load, as relatively considerable currents are switched on and off and have, moreover, to stand a frequent switching off and on. The third method is further objectionable by the fact that anode current flows through the respective parts during inoperative periods. The last named method is disadvantageous in requiring a separate rectifier.

The said drawbacks are eliminated by the method and device according to the invention, wherein in the period or interval between two high frequency impulses, the anode voltage remains on and the cathode is heated, the grid, however, being not grounded so that a large negative bias is formed thereon, said bias locking the thermionic tube and preventing any anode current to flow therethrough. The grid is grounded for high frequency over a condensator so that the generator cannot be set into oscillations.

If the grid is grounded over a grid resistance with a choke coil the oscillator is brought into oscillations and grid current starts flowing through the grid resistance.

The generator is put out of action by connecting the grid directly with earth, so that the energising high frequency voltage on the grid disappears and consequently the oscillator ceases to oscillate. The said direct connection of the grid with the earth is carried out by short circuiting the grid resistance and choke coil. In consequence of the disappearance of oscillations the grid current disappears as well but there remains still a small anode current. If, however, the grid

2 is disconnected from the earth the thermionic tube is locked as described above.

According to the invention the steps set forth below are used in starting operation. In inoperative condition the grid is connected over a grid resistance—which, however, is short-circuited—and over a condensator with the earth. The switching-on operation is carried out in two steps.

1. At first the short circuit of the resistance is broken;
2. The resistance is grounded directly or over a switch coil, as disclosed later.

The stopping operation is carried out also in two steps:

3. The resistance is bridged by short circuiting.
4. The direct grounding of the resistance is broken, there remaining only the grounding over the condensator.

Figure 2:
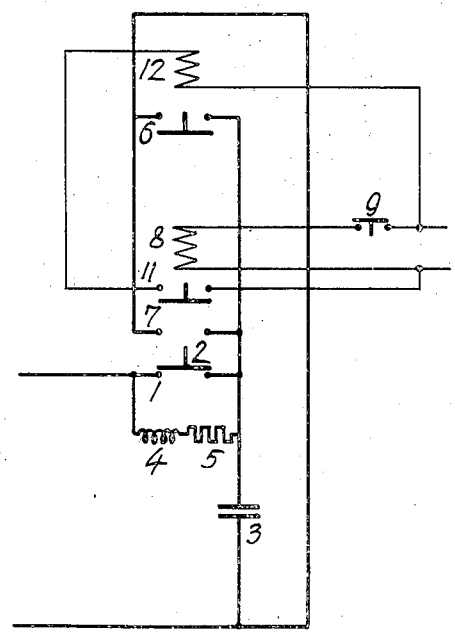
Figure 3:
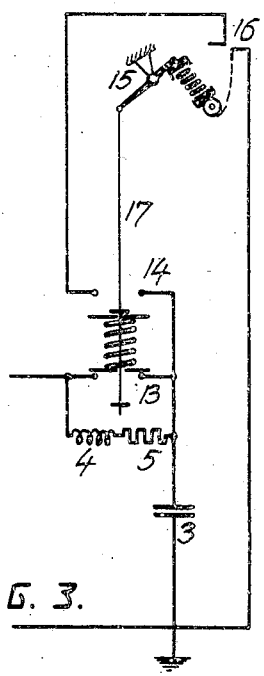
Figure 4:
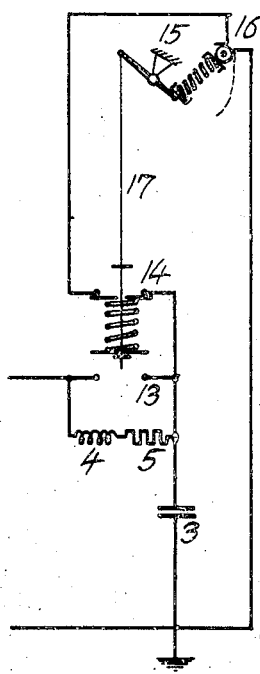

The method according to the invention may be embodied in various ways and by various devices. Three examples embodying the invention are shown in the attached drawings in which Fig. 1 shows the arrangement of the entire oscillator with a device according to the invention, Fig. 2 shows a modification wherein the arrangement of the oscillator itself has not been shown, it being understood that it may be carried out for instance according to Fig. 1, Fig. 3 shows a further modification and Fig. 4 shows the same modification as Fig. 3 but in a different position, the oscillator itself being not shown.

The portion enclosed in the rectangle shown in chained lines in Fig. 1 is a usual oscillation generator, which of course, may have another suitable form. The starting and stopping device itself is represented by the portion outside the said rectangle. In Figs. 2 to 4 incl. this starting and stopping portion only is shown, the oscillation generator remaining unchanged.

As shown in Fig. 1 of the drawing, the grid of the generating thermionic valve in the condition represented—in which the generator is out of operation—is grounded over the closed lower contacts 1 of the switch 2 and condensator 3 so that grounding is carried out only for high frequency and direct grid current cannot flow through. The direct grounding of the grid, which in addition is provided, is broken by opened contacts 7 of the switch 2 and switch 6, said switches being arranged in parallel in the grounding lead. The contacts 1 of the switch 2 are bridged by a high frequency choke coil 4 and grid resistance 5. The switch 2 assumes normally—i. e. when the generator is inoperative—the lower position as shown in the drawing and is brought into its upper position, in which its lower contacts 1 are broken and its upper contacts 7 closed, by current flowing through a coil 8, the circuit of which is controlled by a press button 9. The switch 6 is brought into a position, in which it connects its respective contacts, by grid current flowing through a coil 10.

In putting the generator in operation the circuit of the coil 8 is closed by the press button 9, said coil 8 causing displacement of the switch 2 from contacts 1 to contacts 7. When the contacts 1 are broken, the negative voltage of the grid is not altered and the breakage is carried out without any current passing through, so that the switch operates without any load. When contacts 7 of the switch 2 are connected the grid of the thermionic valve is grounded over the grid resistance 5, and in consequence of this connection the generator is brought into oscillations. In closing the contacts 7 only a small negative charge of the condensator and grid is discharged over these contacts which, therefore, are not particularly loaded either. Direct grid current starts flowing only at the beginning of oscillations. The high frequency current which is simultaneously generated is powerfully attenuated by the resistance 5 and choke 4; it does not flow through contacts 7 of the switch 2 but over the condensator 3. The contacts 7 are therefore practically not burnt at all. As soon as grid current starts flowing through contacts 7 it flows also through the coil 10, which closes the switch 6 in parallel to the contacts 7 of the switch 2 which is by now closed.

In putting the generator out of operation current in the coil 8 is interrupted. The switch 2 falls off, breaking thus contacts 7, but the contacts of the switch 6 remain still closed so that in disconnecting contacts 7 no current is interrupted and the contacts are not subject to any load. The switch 2 connects then the contacts 1, thus short-circuiting the resistance 5. The grid is now connected for high frequency directly with the cathode and the oscillations of the generator are instantaneously brought to a standstill. The burning of contact 1 is therefore negligible. During this operation the grid current is stopped from flowing through the coil 10; contacts of the switch 6 are thus broken, but the contacts do not interrupt any current in this operation as the current has already disappeared before the contacts have been broken.

In the embodiment according to Fig. 2 the arrangement is similar to that according to Fig. 1 and similar reference numerals have been used to denote the various components. In this example, however, the switch 6 is not controlled by the grid current but by the main switch, which is provided with auxiliary contacts 11. The said contacts close the circuit of a coil 12, which is adapted to close the contacts of the switch 6. The latter is provided with a suitable time lag device, which delays the switching on or off of its contacts until the operation of the switch 2 has been completed. The sequence of connections is the same as in the embodiment according to Fig. 1.

The problem may also be solved mechanically, as shown in the embodiment according to Figs. 3 and 4. These figures show a combined arrangement consisting of a switch carried out in such a way that in its intermediate position both pairs of contacts are closed, so that before the contacts 13 are broken, contacts 14 are closed and comprising further an instantaneous switch 15, e. g. lever switch, which connects the contacts 16 only after the switch link 17 has been raised to such an extent that the contacts 13 have been broken (see Fig. 4).

During return movement of the link 17 downwards the contacts 13 are first closed, whereupon contacts 14 are broken and finally the instantaneous switch 15 springs into its disconnecting position. The last two steps may follow also in a reversed sequence.

The operation of this device is similar to that of the previous embodiments. Fig. 3 represents the arrangement in inoperative position—the grid is not grounded, it is merely connected over contacts 13 and condensator 3 with the ground. During the switching-on operation the link 17 travels upwards; first the contacts 14 are closed whereupon contacts 13 are broken. By this switching over no change in the condition of the oscillator takes place as yet, no current being interrupted and no contacts burnt. It is only during further movement of the link 17 upwards that the instantaneous switch 15 closes the contacts 16, connecting thus the grid over the grid resistance 5 and choke coil 4 with the ground whereupon the oscillator is brought into oscillations (see Fig. 4).

The switching-off operation is performed by moving the link 17 downwards. The contacts 13 are first connected, short-circuiting the grid resistance and suppressing the oscillations of the oscillator. The grid is grounded over contacts 13, 14 and 16. The grounding is interrupted during further movement of the link 17 by the switch 15 or by opening of contacts 14, which results in inoperative (rest) condition of the generator.

In the arrangements described above switches are used for negligible switching load, it being possible to safely control a high frequency load in the value of even several hundreds of kilowatts. The entire switching arrangement is practically subject to no electric strain whatsoever, which makes it possible to render its dimensions relatively small and its usure negligible.

While I have disclosed the principles of my invention in connection with several embodiments it will be understood that these embodiments are given by way of example only and not as limiting the scope of the invention as set forth in the appended claims.

I claim:

1. A device for interruptedly operating an oscillating generator without interruption of the flow of the heating and anode current comprising in combination a grid possessing oscillating tube; a ground connection for the grid of said tube; a high frequency choke coil; a resistor; a condenser, the condenser being connected in said ground connection of the grid and the said choke coil and resistance being connected in series between said condenser and said grid; a double throw switch interposed in said ground connection of the grid, the said switch having two sets of contacts; connections for one of said sets of contacts bridging said choke coil and resistance; and further connections for the other of said sets of contacts bridging the said condenser, whereby the position of said switch closing the first set of contacts corresponds to the off-position of the generator and the position closing the second set of contacts corresponds to the on-position of the generator.

2. A device for interruptedly operating an oscillating generator without interruption of the flow of the heating and anode current comprising in combination a grid possessing oscillating tube; a ground connection for the grid of said tube; a high frequency choke coil; a resistor; a condenser, the condenser being connected in said ground connection of the grid and said choke coil and resistance being connected in series between said condenser and said grid; a double throw switch interposed in said ground connection of the grid, the said switch having two sets of contacts; connections for one of said sets of contacts bridging said choke coil and resistance; further connections for the other of said sets of contacts bridging the said condenser; a further switch having its contacts connected in parallel with said connections bridging said condenser; and means for energizing said latter switch upon starting of the generator and for de-energizing it upon stopping of the generator.

3. A device for interruptedly operating an oscillating generator without interruption of the flow of the heating and anode current comprising in combination a grid possessing oscillating tube; a ground connection for the grid of said tube; a high frequency choke coil; a resistor; a condenser, the condenser being connected in said ground connection of the grid and the said choke coil and resistance being connected in series between said condenser and said grid; a double throw switch interposed in said ground connection of the grid, the said switch having two sets of contacts; connections for one of said sets of contacts bridging said choke coil and resistance; further connections for the other of said sets of contacts bridging the said condenser; a further switch having its contacts connected in parallel with said connections bridging said condenser; and a coil interposed in said ground connection of said grid and adapted to energize said latter switch upon actuation of said condenser bridging circuit.

4. A device for interruptedly operating an oscillating generator without interruption of the flow of the heating and anode current comprising in combination a grid possessing oscillating tube; a ground connection for the grid of said tube; a high frequency choke coil; a resistor; a condenser, the condenser being connected in said ground connection of the grid and said choke coil and resistance being connected in series between said condenser and said grid; a double throw switch interposed in said ground connection of the grid, the said switch having two sets of contacts; connections for one of said sets of contacts bridging said choke coil and resistance; further connections for the other of said sets of contacts bridging the said condenser; a further switch having its contacts connected in parallel with said connections bridging said condenser; and a time lag device forming part of the circuit of said latter switch and adapted to delay the energizing and de-energizing of the same until the operation of the first mentioned switch has been completed.

5. A device for interruptedly operating an oscillating generator without interruption of the flow of the heating and anode current comprising in combination a grid possessing oscillating tube; a ground connection for the grid of said tube; a high frequency choke coil; a resistor; a condenser, the condenser being connected in said ground connection of the grid and the said choke coil and resistance being connected in series between said condenser and said grid; a double throw switch interposed in said ground connection of the grid, the said switch having two sets of contacts; connections for one of said sets of contacts bridging said choke coil and resistance; further connections for the other of said sets of contacts bridging the said condenser; a common actuating member for said two sets of contacts, the said member being arranged so that normally one set of contacts is closed and the other opened, and that both sets of contacts are closed for a brief instant in an intermediate position of said actuating member; a further switch adapted for instantaneous function, the latter switch being provided in the ground connection of said grid; and an actuating connection between said latter switch and said first mentioned switch, the said connection being disposed so as to become operative after actuation of said first mentioned switch.

JIŘÍ STIVÍN.

No references cited.